US012136326B2

(12) United States Patent
Bergman et al.

(10) Patent No.: US 12,136,326 B2
(45) **Date of Patent: *Nov. 5, 2024**

(54) SYSTEMS AND METHODS FOR RADIO FREQUENCY IDENTIFICATION ENABLED DEACTIVATION OF ACOUSTO-MAGNETIC FERRITE BASED MARKER

(71) Applicant: Sensormatic Electronics, LLC, Boca Raton, FL (US)

(72) Inventors: Adam S. Bergman, Boca Raton, FL (US); Manuel Soto, Lake Worth, FL (US); Ronald B. Easter, Parkland, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,845

(22) Filed: May 25, 2023

(65) Prior Publication Data

US 2023/0298447 A1 Sep. 21, 2023

Related U.S. Application Data

(63) Continuation of application No. 17/228,241, filed on Apr. 12, 2021, now Pat. No. 11,699,335, which is a (Continued)

(51) Int. Cl.
*G08B 13/24* (2006.01)

(52) U.S. Cl.
CPC ...... *G08B 13/2425* (2013.01); *G08B 13/2411* (2013.01); *G08B 13/2417* (2013.01); *G08B 13/2448* (2013.01); *G08B 13/246* (2013.01)

(58) Field of Classification Search
CPC ............ G08B 13/2425; G08B 13/2411; G08B 13/2417; G08B 13/2448; G08B 13/246
(Continued)

(56) References Cited

U.S. PATENT DOCUMENTS 4,742,341 A * 5/1988 Hogen Esch ...... G08B 13/2414 343/895
5,103,210 A * 4/1992 Rode .................... G08B 13/242 342/51

(Continued)

FOREIGN PATENT DOCUMENTS

EP 2355064 A1 8/2011
WO 0027137 A1 5/2000

(Continued)

OTHER PUBLICATIONS

European Patent Office Action issued in European Patent Application No. EP19712345 on Jun. 6, 2023.

*Primary Examiner* — Omar Casillashernandez
(74) *Attorney, Agent, or Firm* — ArentFox Schiff LLP

(57) ABSTRACT

Systems and methods for operating a marker that involve receiving, by a Radio Frequency Identification ("RFID") element of the marker, an RFID deactivation signal; and responsive to the RFID deactivation signal, supplying power to a detuner element of the marker so that the detuner element switches from a first state to a second state. The marker's resonant frequency is changed to a first value that falls outside of an Electronic Article Surveillance ("EAS") systems operating frequency range when the detuner element switches from the first state to the second state.

20 Claims, 6 Drawing Sheets

Related U.S. Application Data continuation of application No. 16/540,026, filed on Aug. 13, 2019, now Pat. No. 11,011,037, which is a continuation of application No. 15/912,190, filed on Mar. 5, 2018, now Pat. No. 10,380,857.

(58) Field of Classification Search
USPC .......................................................... 340/572.1
See application file for complete search history.

(56) References Cited

U.S. PATENT DOCUMENTS

| | | | | |
|---|---|---|---|---|
| 6,809,645 | B1 * | 10/2004 | Mason | G08B 13/246 340/572.1 |
| 8,648,721 | B2 * | 2/2014 | Copeland | G08B 13/2431 340/572.1 |
| 11,435,887 | B1 * | 9/2022 | Mirho | G06Q 50/184 |
| 2001/0024157 | A1 * | 9/2001 | Hansmann | G06Q 20/102 705/16 |
| 2006/0049947 | A1 * | 3/2006 | Forster | G08B 13/2414 340/572.5 |
| 2016/0321893 | A1 * | 11/2016 | Ren | G08B 13/2408 |

FOREIGN PATENT DOCUMENTS

| | | | |
|---|---|---|---|
| WO | 0175785 | A2 | 10/2001 |
| WO | 2006031531 | A1 | 3/2006 |
| WO | 2006055653 | A1 | 5/2006 |
| WO | 2006057888 | A1 | 6/2006 |

* cited by examiner

SYSTEMS AND METHODS FOR RADIO FREQUENCY IDENTIFICATION ENABLED DEACTIVATION OF ACOUSTO-MAGNETIC FERRITE BASED MARKER

CROSS-REFERENCE TO RELATED APPLICATIONS

The present application is a continuation of U.S. patent application Ser. No. 17/228,241, filed on Apr. 12, 2021 and entitled "SYSTEMS AND METHODS FOR RADIO FREQUENCY IDENTIFICATION ENABLED DEACTIVATION OF ACOUSTO-MAGNETIC FERRITE BASED MARKER," which is a continuation of U.S. patent application Ser. No. 16/540,026, filed on Aug. 13, 2019 and entitled "SYSTEMS AND METHODS FOR RADIO FREQUENCY IDENTIFICATION ENABLED DEACTIVATION OF ACOUSTO-MAGNETIC FERRITE BASED MARKER," which is a continuation of U.S. patent application Ser. No. 15/912,190, now U.S. Pat. No. 10,380,857, filed on Mar. 5, 2018, and entitled "SYSTEMS AND METHODS FOR RADIO FREQUENCY IDENTIFICATION ENABLED DEACTIVATION OF ACOUSTO-MAGNETIC FERRITE BASED MARKER," the contents of which are incorporated by reference in its entirety.

BACKGROUND

Statement of the Technical Field

The present disclosure relates generally to Radio Frequency Identification ("RFID") systems. More particularly, the present disclosure relates to implementing systems and methods for RFID enabled deactivation of Acousto-Magnetic ("AM") ferrite based markers.

Description of the Related Art

A typical Electronic Article Surveillance ("EAS") system in a retail setting may comprise a monitoring system and at least one security tag or marker attached to an article to be protected from unauthorized removal. The monitoring system establishes a surveillance zone in which the presence of security tags and/or markers can be detected. The surveillance zone is usually established at an access point for the controlled area (e.g., adjacent to a retail store entrance and/or exit). If an article enters the surveillance zone with an active security tag and/or marker, then an alarm may be triggered to indicate possible unauthorized removal thereof from the controlled area. In contrast, if an article is authorized for removal from the controlled area, then the security tag and/or marker thereof can be deactivated and/or detached therefrom. Consequently, the article can be carried through the surveillance zone without being detected by the monitoring system and/or without triggering the alarm.

The security tag or marker generally consists of a housing. The housing is made of a low cost plastic material, such as polystyrene. The housing is typically manufactured with a drawn cavity in the form of a rectangle. An LC circuit is disposed within the housing. The LC circuit comprises a ferrite rod coil connected in series with a capacitor. During operation, the LC circuit produces a resonant signal with a particular amplitude that is detectable by the monitoring system.

Conventional deactivation processes for EAS security tags or markers are not convenient for self or mobile checkout due to high power and complexity of the deactivation electronics required to deactivate the same. Many attempts have been made to find alternative solutions to deactivate EAS security tags or markers without success.

SUMMARY

The present disclosure generally concerns implementing systems and methods for operating a marker. The methods comprise: receiving, by an RFID element of the marker, an RFID deactivation signal transmitted from an external device (e.g., a Point Of Sale ("POS") terminal in response to a successful purchase transaction of an article to which the marker is coupled); responsive to the RFID deactivation signal, supplying power from the RFID element to a detuner element so that the detuner element switches from a first state to a second state; and/or discontinuing the supply of power to the detuner element. The marker's resonant frequency is changed to a first value that falls outside of an Electronic Article Surveillance ("EAS") systems operating frequency range when the detuner element switches from the first state to the second state.

In some scenarios, the detuner element is electronically connected to an LC circuit of the marker. More specifically, the detuner element is electronically connected in series between a capacitor and a ferrite rod coil of the LC circuit. The detuner element may comprise: a magnetic component configured to change a magnetic state from a first magnetic state to a second magnetic state when power is applied thereto, and remain in the second magnetic state when power is removed; or a switch component configured to transition from a closed positon to an open position when power is supplied thereto, and remain in the open position when power is removed.

In those or other scenarios, the marker comprises a re-usable marker. The re-usable marker is configured to: receive an RFID activation signal transmitted from the external device or another external device; and (in response to the RFID activation signal's reception) supplying power to a detuner element so that the detuner element switches from the second state to the first state. The marker's resonant frequency is changed to a second value that falls within the EAS systems operating frequency range when the detuner element switches from the second state to the first state.

In those or yet other scenarios, the marker is provided with an energy harvesting element. The energy harvesting element is configured to perform operations to collect energy in a surrounding environment. The collected energy is used to enable operations of the RFID element and the detuner element.

BRIEF DESCRIPTION OF THE DRAWINGS

The present solution will be described with reference to the following drawing figures, in which like numerals represent like items throughout the figures.

DETAILED DESCRIPTION

Figure 1:
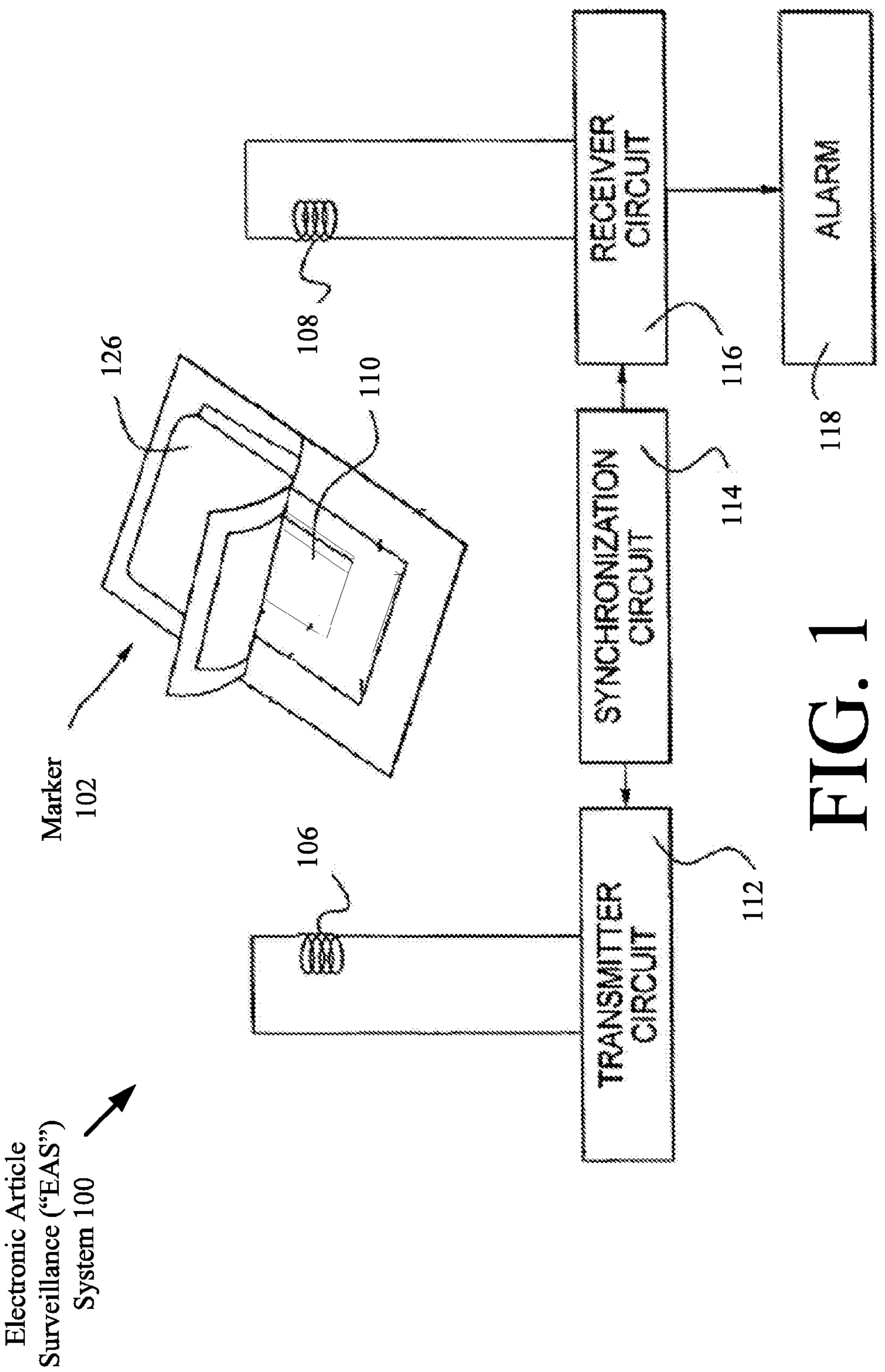
FIG. 1 is an illustration of an illustrative architecture for a EAS system comprising at least one marker.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution generally concerns a combined tag or marker which includes both RFID component(s) and AM component(s). The novelty of the present solution is that there is a connection between the RFID component(s) (e.g., an RFID chip) and the AM component(s). This connection allows the RFID component(s) to receive from a Point Of Sale ("POS") messages identifying products that have been successfully purchased. In response to these messages, the RFID component(s) performs operations to disable the AM component(s) such that the AM feature the tag or marker is deactivated.

Illustrative EAS System

Referring now to FIG. 1, there is provided a schematic illustration of an illustrative EAS system 100. The EAS system 100 comprises a monitoring system 106-112, 114-118 and at least one marker 102. The marker 102 may be attached to an article to be protected from unauthorized removal from a business facility (e.g., a retail store). The monitoring system comprises a transmitter circuit 112, a synchronization circuit 114, a receiver circuit 116 and an alarm 118.

During operation, the monitoring system 106-112, 114-118 establishes a surveillance zone in which the presence of the marker 102 can be detected. The surveillance zone is usually established at an access point for the controlled area (e.g., adjacent to a retail store entrance and/or exit). If an article enters the surveillance zone with an active marker 102, then an alarm may be triggered to indicate possible unauthorized removal thereof from the controlled area. In contrast, if an article is authorized for removal from the controlled area, then the marker 102 can be deactivated and/or detached therefrom. Consequently, the article can be carried through the surveillance zone without being detected by the monitoring system and/or without triggering the alarm 118.

The operations of the monitoring system will now be described in more detail. The transmitter circuit 112 is coupled to the antenna 106. The antenna 106 emits transmit (e.g., "Radio Frequency ("RF")) bursts at a predetermined frequency (e.g., 58 KHz) and a repetition rate (e.g., 50 Hz, 60 Hz, 75 Hz or 90 Hz), with a pause between successive bursts. In some scenarios, each transmit burst has a duration of about 1.6 ms. The transmitter circuit 112 is controlled to emit the aforementioned transmit bursts by the synchronization circuit 114, which also controls the receiver circuit 116. The receiver circuit 116 is coupled to the antenna 108. The antenna 106, 108 comprises close-coupled pick up coils of N turns (e.g., 100 turns), where N is any number.

When the marker 102 resides between the antennas 106, 108, the transmit bursts transmitted from the transmitter 112, 108 cause a signal to be generated by the marker 102. In this regard, the marker 102 comprises a circuit 110 disposed in a marker housing 126. The transmit bursts emitted from the transmitter 112, 106 cause the circuit 110 to generate a response at a resonant frequency (e.g., 58 KHz). As a result, a resonant response signal is produced with an amplitude that decays exponentially over time.

The synchronization circuit 114 controls activation and deactivation of the receiver circuit 116. When the receiver circuit 116 is activated, it detects signals at the predetermined frequency (e.g., 58 KHz) within first and second detection windows. In the case that a transmit burst has a duration of about 1.6 ms, the first detection window will have a duration of about 1.7 ms which begins at approximately 0.4 ms after the end of the transmit burst. During the first detection window, the receiver circuit 116 integrates any signal at the predetermined frequency which is present. In order to produce an integration result in the first detection window which can be readily compared with the integrated signal from the second detection window, the signal emitted by the marker 102 should have a relatively high amplitude (e.g., greater than or equal to about 1.5 nanowebers (nWb)).

After signal detection in the first detection window, the synchronization circuit 114 deactivates the receiver circuit 116, and then re-activates the receiver circuit 116 during the second detection window which begins at approximately 6 ms after the end of the aforementioned transmit burst. During the second detection window, the receiver circuit 116 again looks for a signal having a suitable amplitude at the predetermined frequency (e.g., 58 kHz). Since it is known that a signal emanating from the marker 102 will have a decaying amplitude, the receiver circuit 116 compares the amplitude of any signal detected at the predetermined frequency during the second detection window with the amplitude of the signal detected during the first detection window. If the amplitude differential is consistent with that of an exponentially decaying signal, it is assumed that the signal did, in fact, emanate from a marker between antennas 106, 108. In this case, the receiver circuit 116 issues an alarm 118.

The transmitter and receiver circuits 112, 118 may also be configured to act as an RFID reader. In these scenarios, the transmitter 112 transmits an RFID interrogation signal for purposes of obtaining RFID data from the active marker 102. The RFID data can include, but is not limited to, a unique identifier for the active marker 102. In other scenarios, these RFID functions are provided by devices separate and apart from the transmitter and receiver circuits 112, 118.

Figure 2:
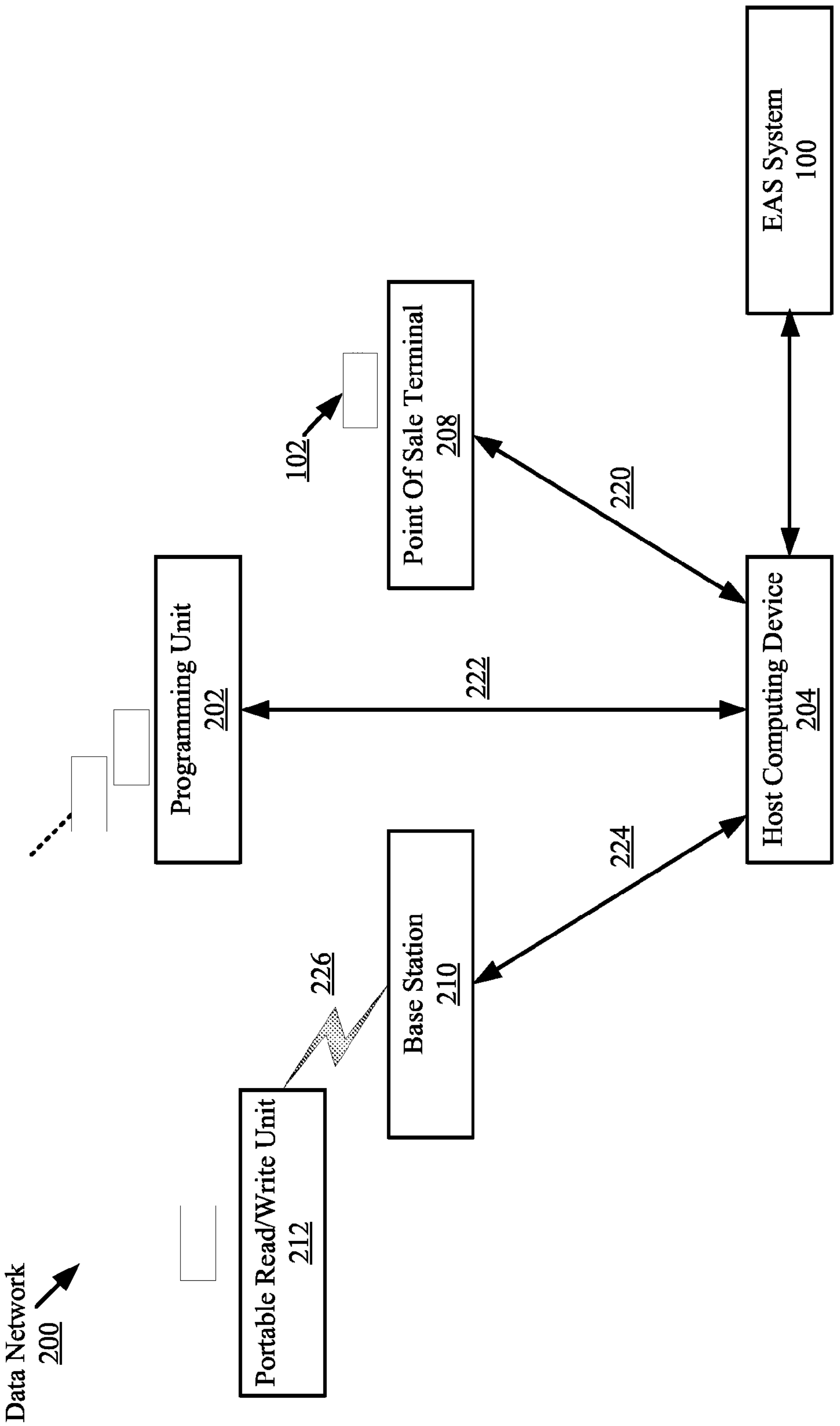
FIG. 2 is an illustration of a data network employing the EAS system of FIG. 1.

Referring now to FIG. 2, there is provided a schematic illustration of an exemplary architecture for a data network 200 in which the EAS system 100 is employed. Data network 200 comprises a host computing device 204 which stores data concerning at least one of merchandise identification, inventory, and pricing. The host computing device 204 can include, but is not limited to, a server, a personal computer, a desktop computer, and/or a laptop computer.

A first data signal path 220 allows for two-way data communication between the host computing device 204 and a POS terminal 208. A second data signal path 222 permits data communication between the host computing device 204 and a programming unit 202. The programming unit 202 is generally configured to write product identifying data and other information into memory of the marker 102. Marker programing units are well known in the art, and will not be described herein. Any known or to be known marker programming unit can be used herein without limitation.

A third data signal path 224 permits data communication between the host computing device 204 and a base station 210. The base station 210 is in wireless communication with a portable read/write unit 212. Base stations are well known in the art, and will not be described herein. Any known or to be known base station can be used herein without limitation.

The portable read/write unit 212 reads data from the markers for purposes of determining the inventory of the retail store, as well as writes data to the markers. Data can be written to the EAS markers when they are applied to articles of merchandise. Portable read/write units are well known in the art, and will not be described herein. Any known or to be known portable read/write unit can be used herein without limitation.

In general, the POS terminal 208 facilitates the purchase of articles from the retail store. POS terminals and purchase transactions are well known in the art, and therefore will not be described herein. Any known or to be known POS terminal and purchase transaction can be used herein without limitation. The POS terminal can be a stationary POS terminal or a mobile POS terminal.

As should be understood, alarm issuance of the EAS system 100 is not desirable when the item to which the marker 102 is coupled has been successfully purchased. Accordingly, the POS terminal 102 includes a marker deactivator. Upon a successful completion of a purchase transaction, a marker deactivation process is initialized. The marker deactivation process involves: communicating an RFID deactivation command from the POS terminal 208 (or other RFID enabled device) to the marker 102; receiving the RFID deactivation command at the marker 102; and perform operations by the marker's RFID element to detune the AM element thereof. Once detuned, the marker is considered a deactivated marker. The deactivated marker will still be responsive (unless the switch version is utilized) to the electromagnetic field emitted from the transmitter circuit 112, 106. However, the frequency of the resonant response signal is outside the range of the EAS system. For example, in some scenarios, the EAS system 100 is tuned to detect resonant response signals having a frequency between 57 KHz and 59 KHz, and is configured to issue an alarm in response to such detection. The EAS system 100 will not issue an alarm in response to any response signal having a frequency outside the 57-59 KHz range. The present solution is not limited to the particulars of this example.

Illustrative Marker Architectures

Figure 3:
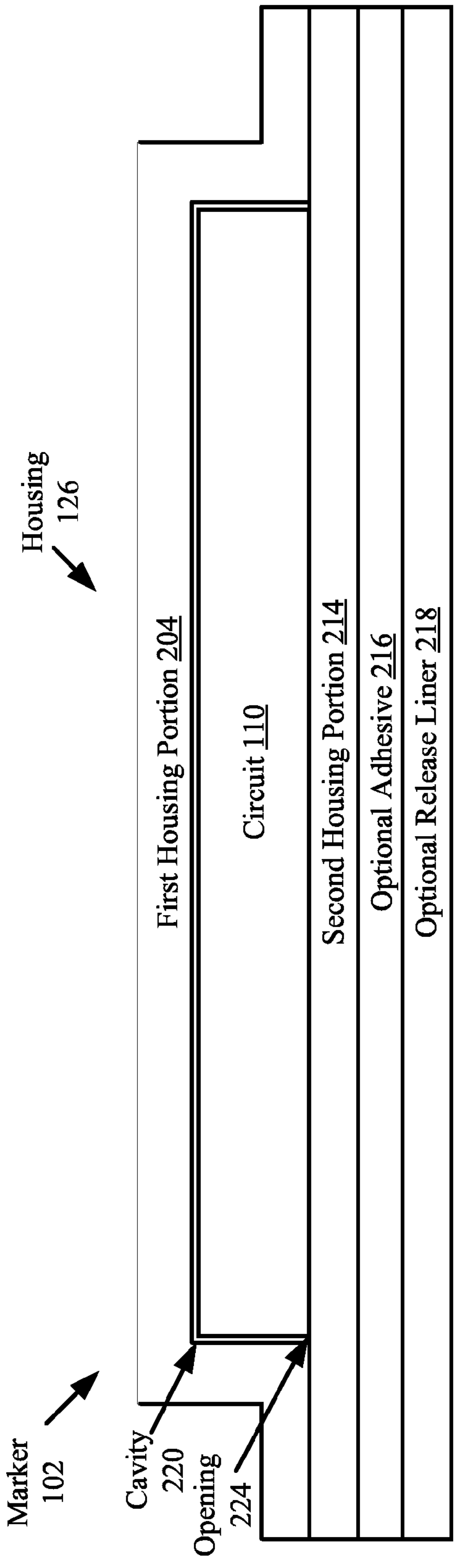
FIG. 3 is an illustration of an illustrative architecture for the marker shown in FIG. 1.

Referring now to FIG. 3 there is provided an illustration of an architecture for the marker 102 shown in FIG. 1. Marker 102 is not limited to the structure shown in FIG. 3. The marker 102 can have any security tag, label or marker architecture depending on a given application.

As shown in FIG. 3, marker 102 comprises a housing 126 formed of a first housing portion 204 and a second housing portion 214. The housing 126 can include, but is not limited to, a high impact polystyrene. Optionally, an adhesive 216 and release liner 218 are disposed on the bottom surface of the second housing portion 214 so that the marker 102 can be attached to an article (e.g., a piece of merchandise or product packaging).

Figure 4:
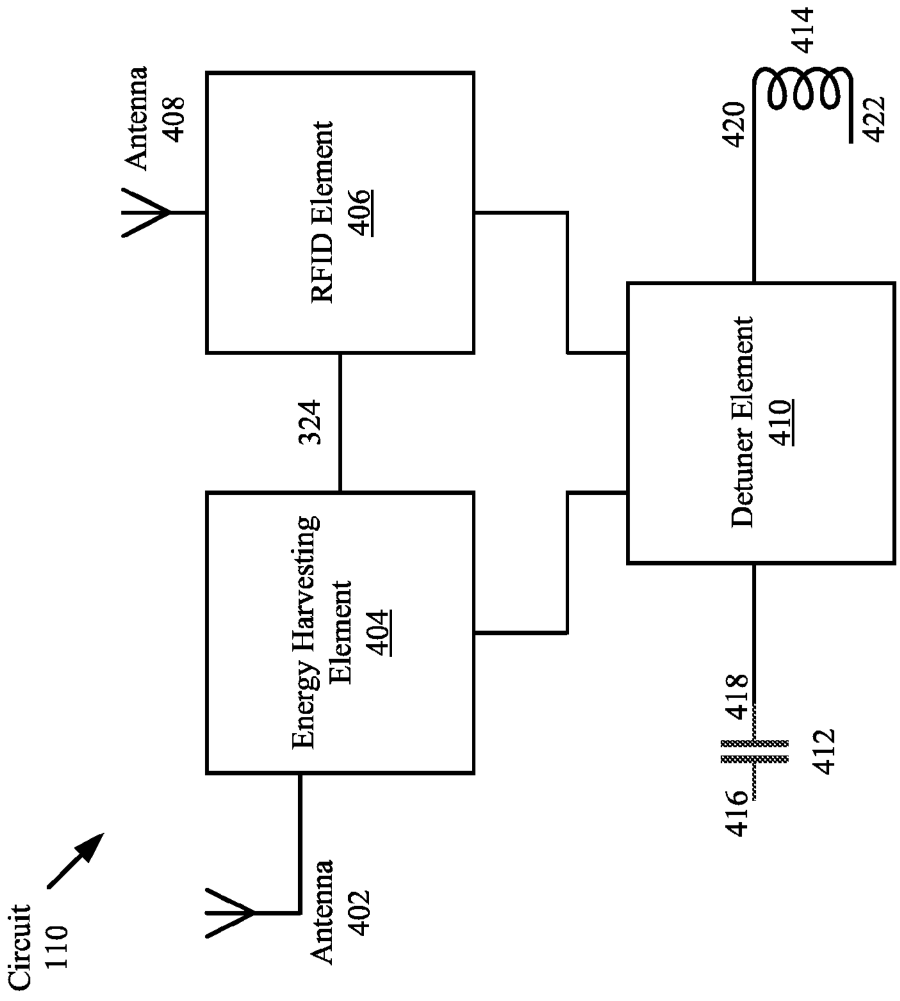
FIG. 4 is an illustration of an illustrative architecture for the circuit shown in FIG. 3.

A cavity 220 is formed in the first housing portion 204. The circuit 110 is disposed in the cavity 220. A more detailed diagram of the circuit 110 is provided in FIG. 4. As shown in FIG. 4, the circuit 110 generally comprises an LC circuit 412, 414. The LC circuit usually comprises a ferrite rod coil 314 (or other inductive component and/or core material) connected in series with a capacitor 412. The capacitor 412 has a first end 416 which is floating. A second end 418 of the capacitor 412 is connected to a first end 420 of the inductor 414 via detuner element 410. A second end 422 of the inductor 414 is floating. During operation, the LC circuit 412, 414 is tuned to produce a resonant signal with a particular amplitude and frequency (e.g., 58 KHz) that is detectable by the EAS system 100.

The circuit 110 also comprises an RFID element 406 which is powered by an energy harvesting element 404. Energy harvesting circuits are well known in the art, and therefore will not be described herein. Any known or to be known energy harvesting circuit can be used herein without limitation. Such known energy harvesting circuits are described in U.S. patent application Ser. Nos. 15/833,183 and 15/806,062. In some scenarios, the energy harvesting element 404 is configured to collect Radio Frequency ("RF") energy via antenna 402 and charge an energy storage device (e.g., a capacitor) using the collected RF energy. The stored energy enables operations of the RFID element 406. An output voltage of the energy storage device is supplied to the RFID element 406 via connection 424.

The RFID element 406 is configured to act as a transponder in connection with the article identification aspects of the EAS system (e.g., EAS system 100 of FIG. 1). In this regard, the RFID element 406 stores multi-bit identification data and emits an identification signal corresponding to the stored multi-bit identification data. The identification signal is emitted in response to the reception of the RFID interrogation signal (e.g., the RFID interrogation signal transmitted from the antenna pedestals 112, 116 of FIG. 1, POS terminal 208 of FIG. 2, and/or portable read/write unit 212 of FIG. 2). In some scenarios, the transponder circuit of the RFID element 406 is the model 210 transponder circuit available from Gemplus, Z.I. Athelia III, Voie Antiope, 13705 La Ciotat Cedex, France. The model 210 transponder circuit is a passive transponder which operates at 13 MHz and has a considerable data storage capability.

The RFID element 406 is also configured to facilitate the deactivation of the marker 102. The marker is deactivated when the LC circuit 412, 414 is detuned. The LC circuit detuning is achieved via a detuner element 410 connected between the capacitor 412 and inductor 414 of the LC circuit. The detuner element 410 is generally configured to alter at least one characteristic (e.g., the capacitance or inductance) of the LC circuit such that its resonant frequency differs from the incoming frequency by a certain amount (e.g., more than ±3 KHz from the operating frequency 58 KHz of the EAS system 100). The LC circuit detuning is performed in response to the RFID element's reception of an RFID deactivation signal (e.g., the RFID deactivation signal transmitted from the antenna pedestals 112, 116 of FIG. 1, POS terminal 208 of FIG. 2, and/or portable read/write unit 212 of FIG. 2).

In some scenarios, the detuner element 410 is designed to switch states when power is supplied thereto from the RFID element 406 and remain in the new state even when the power is removed. The detuner element 410 includes, but is not limited to, a latching core component or a latching switch component. Latching core components and latching switch components are well known in the art, and therefore will not be described in detail herein. Any known or to be known latching core component or latching switch component can be used herein without limitation.

The latching core component is a magnetic component designed to change its magnetic state from a first magnetic state to a second magnetic state when power is applied thereto, and remain in its second magnetic state when power is removed. A change in the magnetic state forces the magnetic field of the latching core to change directions. This change in the latching core's magnetic field direction either causes (a) a resonance frequency of the LC circuit to change (e.g., decrease or increase) to a value that falls out of the EAS system's operating frequency range or (b) the resonance frequency of the LC circuit to return to a value that falls within the EAS system's operating frequency range. Feature (b) may be a selective feature. For example, if the marker is a one-time use marker, then the marker will be absent of the ability to return to its first magnetic state. However, if the marker is a re-usable marker, then the marker will be provided with the ability to return to its first magnetic state.

The latching switch component is designed to transition from a closed positon to an open position when power is supplied thereto, and remain in its open positon when power is removed. In the closed position, a closed circuit is formed between the capacitor 412 and inductor 414. In the open position, an open circuit is formed between the capacitor 412 and inductor 414. When an open circuit is formed between the capacitor 412 and inductor 414, the resonance frequency of the LC circuit changes (e.g., decrease or increase) to a value that falls out of the EAS system's operating frequency range. In some cases, the marker may be a re-usable marker. The re-usable marker is able to be returned to its closed position such that the resonant frequency of the LC circuit once again falls within the EAS system's operating frequency range.

Figure 5:
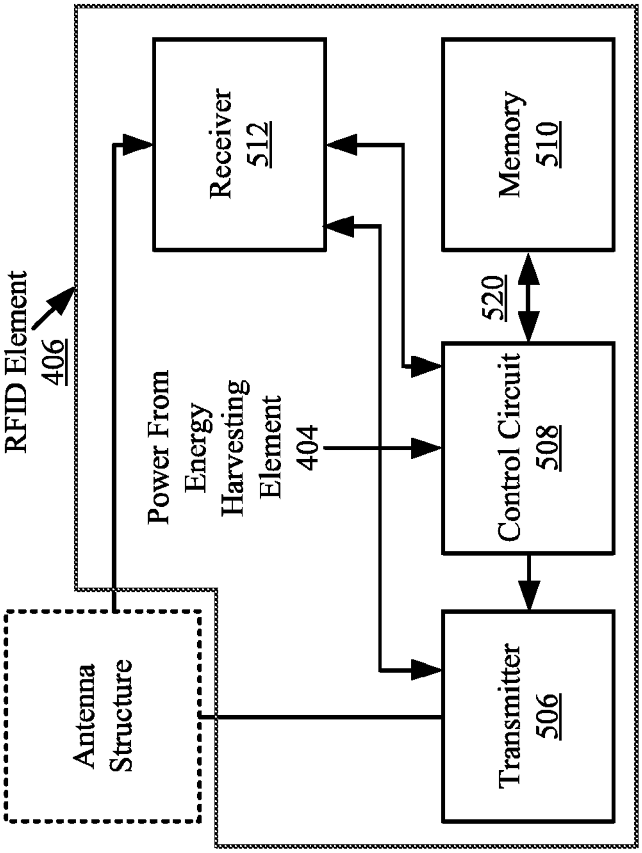
FIG. 5 is a block diagram of the RFID element shown in FIG. 4.

Referring now to FIG. 5, there is provided a block diagram of an exemplary architecture for the RFID element 406. The RFID element 406 may include more or less components than those shown in FIG. 5. However, the components shown are sufficient to disclose an illustrative embodiment implementing the present solution. Some or all of the components of the RFID element 406 can be implemented in hardware, software and/or a combination of hardware and software. The hardware includes, but is not limited to, one or more electronic circuits. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

The RFID element 406 comprises a transmitter 506, a control circuit 508, memory 510 and a receiver 512. Notably, components 506 and 512 are coupled to an antenna structure 408 when implemented in the marker 102. As such, an antenna structure is shown in FIG. 5 as being external to the RFID element 406. The antenna structure is tuned to receive a signal that is at an operating frequency of the EAS system (e.g., EAS system 100 of FIG. 1). For example, the operating frequency to which the antenna structure is tuned may be 13 MHz.

The control circuit 508 controls the overall operation of the RFID element 406. Connected between the antenna structure and the control circuit 508 is a receiver 512. The receiver 512 captures data signals carried by a carrier signal to which the antenna structure is tuned. In some scenarios, the data signals are generated by on/off keying the carrier signal. The receiver 512 detects and captures the on/off keyed data signal.

Also connected between the antenna structure and the control circuit 508 is the transmitter 506. The transmitter 506 operates to transmit a data signal via the antenna structure. In some scenarios, the transmitter 506 selectively opens or shorts at least one reactive element (e.g., reflectors and/or delay elements) in the antenna structure to provide perturbations in an RFID interrogation signal, such as a specific complex delay pattern and attenuation characteristics. The perturbations in the interrogation signal are detectable by an RFID reader (e.g., the EAS system 100 of FIG. 1, portable read/write unit 212 of FIG. 2, the POS terminal 208 of FIG. 2, and/or the programming unit 202 of FIG. 2).

The control circuit 508 may store various information in memory 510. Accordingly, the memory 510 is connected to and accessible by the control circuit 508 through electrical connection 520. The memory 510 may be a volatile memory and/or a non-volatile memory. For example, memory 512 can include, but is not limited to, a Radon Access Memory ("RAM"), a Dynamic RAM ("DRAM"), a Read Only Memory ("ROM") and a flash memory. The memory 510 may also comprise unsecure memory and/or secure memory. The memory 510 can be used to store identification data which may be transmitted from the RFID element 406 via an identification signal. The memory 510 may also store other information received by receiver 512. The other information can include, but is not limited to, information indicative of the handling or sale of an article.

The components 506, 508, 512 are connected to the energy harvesting element 404 which accumulates power from a signal induced in an antenna 402 as a result of the reception of an RFID signal. The energy harvesting element 404 is configured to supply power to the transmitter 506, control circuit 508, and receiver 512. The energy harvesting element 404 may include, but is not limited to, a storage capacitor.

Illustrative Method for Operating a Marker

Figure 6:
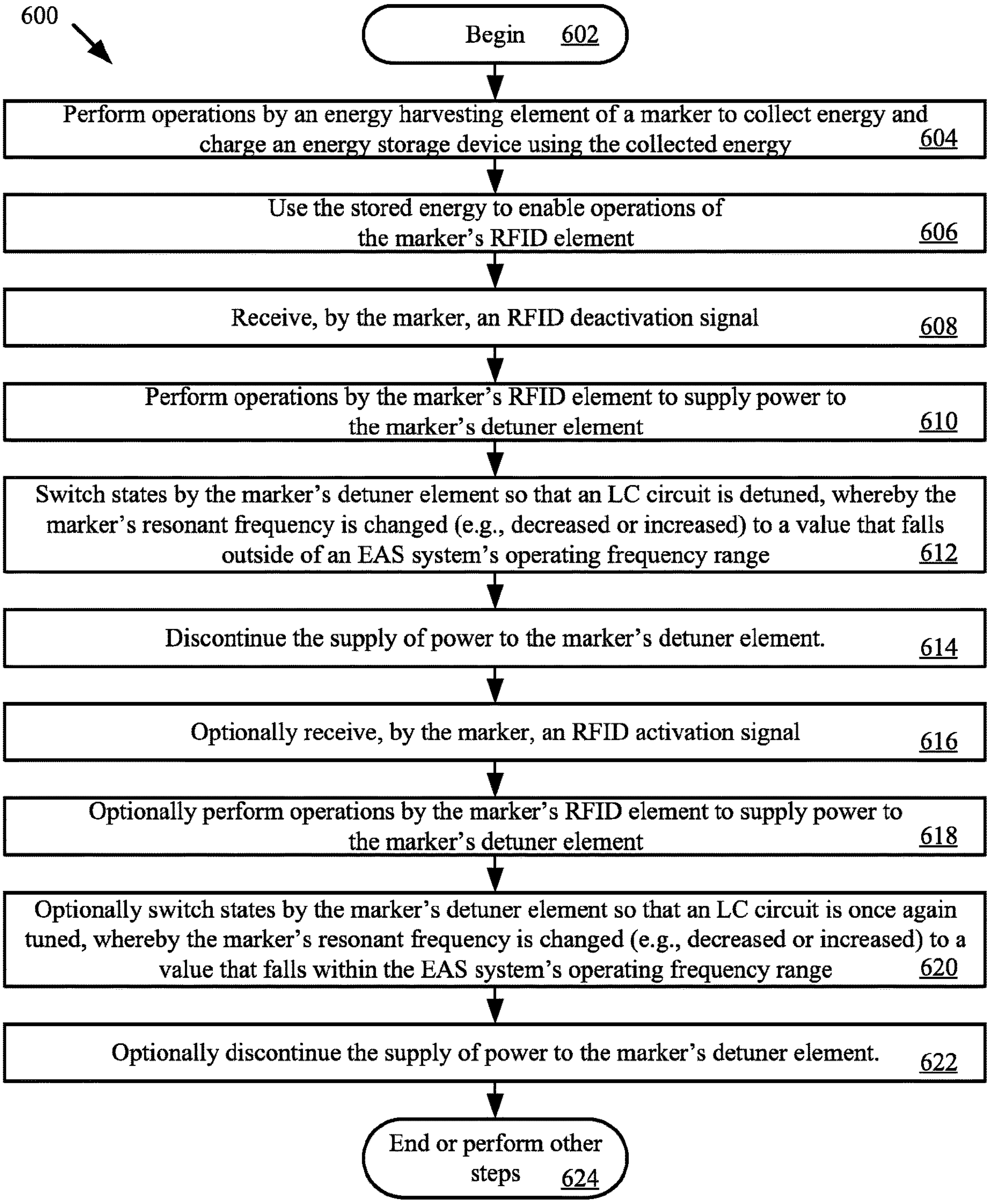
FIG. 6 is a flow diagram of an illustrative method for operating a marker.

Referring now to FIG. 6, there is provided a flow diagram of an illustrative method 600 for operating a marker (e.g., marker 102 of FIG. 1). Method 600 begins with 602 and continues with 604 where an energy harvesting element (e.g., energy harvesting element 404 of FIG. 4) performs operations to collect energy (e.g., RF energy and/or AM energy) and charge an energy storage device (e.g., a capacitor) using the collected energy. The stored energy is used in 606 to enable operations of the marker's RFID element (e.g., RFID element 406 of FIG. 4). In 608, the marker receives an RFID deactivation signal transmitted from an external device (e.g., antenna pedestals 112, 116 of FIG. 1, POS terminal 208 of FIG. 2, and/or portable read/write unit 212 of FIG. 2). In response to the RFID deactivation signal's reception, the marker's RFID element performs operations to supply power to a detuner element (e.g., detuner element 410 of FIG. 4). When power is supplied to the detuner element, it switches states. Consequently, the marker's resonant frequency changes (e.g., decreased or increased) to a value that falls outside of an EAS system's operating frequency range. Next in 614, the RFID element stops supplying power to the detuner element. Notably, the detuner element remains in its new state after power is no longer supplied thereto.

In some cases, the marker may be a reusable marker. Thus, it may be desirable to retune the marker at a later time. In this case, method 600 continues with optional 616-622. 616-618 involve: receiving, by the marker, an RFID activation signal; and performing operations by the marker's RFID element to supply power to the marker's detuner element. As a result, the marker's detuner element switches states so that the marker's LC circuit (e.g., LC circuit 412/414 of FIG. 4) is once again tuned. In effect, the marker's resonant frequency is changed (e.g., decreased or increased) to a value that falls within the EAS system's operating frequency range. Next in 622, the RFID element stops supplying power to the detuner element. Subsequently, 624 is performed where method 600 ends or other processing is performed (e.g., return to 604).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a marker, comprising:

receiving, by an active radio frequency identification (RFID) element of a marker, an RFID deactivation signal; and responsive to the RFID deactivation signal, supplying power to a detuner element of the marker so that the detuner element switches from a first state to a second state, wherein a resonant frequency of a passive Acousto-Magnetic circuit of the marker is changed to a first value outside of an operating frequency range when the detuner element switches from the first state to the second state.

2. The method according to claim 1, wherein the RFID deactivation signal is transmitted from a Point Of Sale ("POS") terminal.

3. The method according to claim 1, wherein the RFID deactivation signal is transmitted in response to a transaction of an article.

4. The method according to claim 1, wherein the passive Acousto-Magnetic circuit comprises an LC circuit.

5. The method according to claim 4, wherein the detuner element is electronically coupled in series between a capacitor and a ferrite rod coil of the LC circuit.

6. The method according to claim 1, wherein the detuner element comprises a magnetic component configured to (a) change a magnetic state from a first magnetic state to a second magnetic state when power is applied thereto, and (b) remain in the second magnetic state when power is removed.

7. The method according to claim 1, wherein the detuner element comprises a switch component configured to (a) transition from a closed position to an open position when power is supplied thereto, and (b) remain in the open position when power is removed.

8. The method according to claim 1, further comprising discontinuing the supply of power to the detuner element.

9. The method according to claim 8, further comprising:

receiving, by the active RFID element, an RFID activation signal transmitted from an external device; and responsive to the RFID activation signal, supplying power from the active RFID element to the detuner element so that the detuner element switches from the second state to the first state, wherein the resonant frequency of the passive Acousto-Magnetic circuit is changed to a second value within the operating frequency range when the detuner element switches from the second state to the first state.

10. The method according to claim 1, further comprising:

performing operations by an energy harvesting element of the marker to collect energy in a surrounding environment; and using the collected energy to enable operations of the active RFID element.

11. A marker, comprising:

an Acousto-Magnetic circuit;

a detuner element; and a Radio Frequency Identification ("RFID") element configured to receive a RFID deactivation signal from an external device and supply power to the detuner element in response to the RFID deactivation signal, wherein:

the detuner element is electronically connected between the RFID element and the Acousto-Magnetic circuit, and configured to switch from a first state to a second state when power is supplied from the RFID element, the RFID element is separate from the Acousto-Magnetic circuit, and a resonant frequency of the Acousto-Magnetic circuit is changed to a first value outside of an operating frequency range when the detuner element switches from the first state to the second state.

12. The marker according to claim 11, wherein the RFID deactivation signal is transmitted from a Point Of Sale ("POS") terminal.

13. The marker according to claim 11, wherein the RFID deactivation signal is transmitted in response to a purchase transaction of an article.

14. The marker according to claim 11, wherein the Acousto-Magnetic circuit comprises an LC circuit.

15. The marker according to claim 14, wherein the detuner element is electronically connected in series between a capacitor and a ferrite rod coil of the LC circuit.

16. The marker according to claim 11, wherein the detuner element comprises a magnetic component configured to (a) change a magnetic state from the first state to the second state when power is applied thereto, and (b) remain in the second state when power is removed.

17. The marker according to claim 11, wherein the detuner element comprises a switch component configured to (a) transition from a closed position to an open position when power is supplied thereto, and (b) remain in the open position when power is removed.

18. The marker according to claim 11, wherein the RFID element is further configured to discontinue the supply of power to the detuner element.

19. The marker according to claim 18, wherein the RFID element is further configured to receive a RFID activation signal transmitted from the external device or another external device, and supply power to the detuner element, in response to the RFID activation signal, so as to cause the detuner element to switch from the second state to the first state, and wherein resonant frequency of the marker is changed to a second value within the operating frequency range when the detuner element switches from the second state to the first state.

20. The marker according to claim 11, further comprising an energy harvesting element configured to collect energy in a surrounding environment that is used to enable operations of the RFID element.

* * * * *